United States Patent
Hiebert

(10) Patent No.: US 10,527,229 B2
(45) Date of Patent: Jan. 7, 2020

(54) OIL FILTER BIB

(71) Applicant: Eugene Lloyd Hiebert, Salem, OR (US)

(72) Inventor: Eugene Lloyd Hiebert, Salem, OR (US)

( * ) Notice: Subject to any disclaimer, the term of this patent is extended or adjusted under 35 U.S.C. 154(b) by 188 days.

(21) Appl. No.: 15/699,893

(22) Filed: Sep. 8, 2017

(65) Prior Publication Data

US 2018/0094771 A1 Apr. 5, 2018

Related U.S. Application Data

(60) Provisional application No. 62/402,079, filed on Sep. 30, 2016.

(51) Int. Cl.
*F16N 31/00* (2006.01)
*F01M 11/04* (2006.01)

(52) U.S. Cl.
CPC ........... *F16N 31/006* (2013.01); *F01M 11/04* (2013.01)

(58) Field of Classification Search
CPC ... F16N 31/002; F01M 11/0408; B01D 35/31; B01D 2201/24; B25B 27/0042
USPC ......................................................... 184/1.5
See application file for complete search history.

(56) References Cited

U.S. PATENT DOCUMENTS

| | | | | |
|---|---|---|---|---|
| 3,874,478 A | * | 4/1975 | Mantell, Jr. | ........ F01M 11/0408 184/1.5 |
| 4,020,922 A | * | 5/1977 | Klasel | .................... B01D 35/31 184/1.5 |
| 4,329,231 A | * | 5/1982 | Hoffman | ................ B01D 27/08 123/196 A |
| 4,376,703 A | * | 3/1983 | Krauss | .................... B01D 35/31 184/1.5 |
| 4,485,853 A | * | 12/1984 | Gunderson | ........ F01M 11/0408 137/1 |
| 4,930,602 A | * | 6/1990 | Gust | ...................... F16N 31/002 184/1.5 |
| 5,121,776 A | * | 6/1992 | Kovach | .............. F01M 11/0408 141/114 |
| 5,271,299 A | * | 12/1993 | Wadsworth | ............. F16N 33/00 7/100 |
| 5,316,386 A | * | 5/1994 | Moore | ................... F16N 31/002 184/1.5 |
| 5,366,084 A | * | 11/1994 | Post | ....................... B01D 35/31 206/319 |
| 5,366,400 A | * | 11/1994 | Kucik | .................. B01D 35/153 210/DIG. 17 |

(Continued)

*Primary Examiner* — Henry Y Liu
(74) *Attorney, Agent, or Firm* — Klarquist Sparkman, LLP

(57) ABSTRACT

In one embodiment, a flexible oil filter bib comprises an open end, a closed end, and upper and lower side panels, an oil filter removal aperture configured to permit access by an oil filter removal tool and graspable tabs configured to secure a portion of the bib under the oil filter. In some embodiments, a disposal compartment is configured to receive a removed oil filter and used oil. In some embodiments, a folded edge is formed at the open end of the bib to further contain used oil. In particular embodiments, one or more pockets can receive an end of an elongate tool to facilitate positioning the bib. In another embodiment, a bag is placed at least partially around an oil filter by placing a lower portion of the bag under the fixed end of the oil filter and inserting a tool through an aperture in the bag to remove the oil filter, allowing it to fall into the bag.

20 Claims, 12 Drawing Sheets

(56) References Cited

U.S. PATENT DOCUMENTS

| | | | | |
|---|---|---|---|---|
| 5,421,223 | A | * | 6/1995 | Wawrzyniak ....... B25B 27/0042 210/238 |
| 5,469,935 | A | * | 11/1995 | Hewuse ................ B01D 35/31 141/86 |
| 5,623,755 | A | * | 4/1997 | Childress ............... B01D 35/31 141/114 |
| 5,630,451 | A | * | 5/1997 | Bernard ............. F01M 11/0408 141/10 |
| 5,655,624 | A | * | 8/1997 | Kelly, Jr. .............. F16N 31/002 184/1.5 |
| 5,722,508 | A | * | 3/1998 | Kraus .................... F01M 11/04 141/98 |
| 5,857,503 | A | * | 1/1999 | Vreeken ............. F01M 11/0408 141/1 |
| 6,019,196 | A | * | 2/2000 | Selby ................ F01M 11/0458 123/196 A |
| 6,056,874 | A | * | 5/2000 | Goodman ............. F16N 31/002 137/312 |
| 6,769,516 | B2 | * | 8/2004 | Carlson ................ F16N 31/002 141/331 |
| 7,662,285 | B2 | * | 2/2010 | Bilski .................... B01D 27/08 210/248 |
| 2003/0062221 | A1 | * | 4/2003 | Burrow .............. B25B 27/0042 184/1.5 |
| 2005/0067343 | A1 | * | 3/2005 | Zulauf .................. B01D 27/00 210/443 |
| 2005/0224292 | A1 | * | 10/2005 | Rubang, Jr. .......... F16N 31/004 184/1.5 |
| 2017/0165820 | A1 | * | 6/2017 | Leo .................... B25B 27/0042 |

* cited by examiner

OIL FILTER BIB

CROSS REFERENCE TO RELATED APPLICATION

This application claims priority to U.S. Provisional Patent Application No. 62/402,079, filed Sep. 30, 2016, which is hereby incorporated herein by reference.

FIELD

This disclosure relates to apparatus and methods for preventing spillage of oil during the removal of an oil filter.

BACKGROUND

The process of removing an oil filter from a motor vehicle engine is well-known, and has likely existed for almost as long as there have been internal combustion engines. Due to the presence of oil in the filter at the time of removal and residual oil in the engine, however, the removal process can be a messy one, with oil dripping out onto the hands or clothes of the person removing the filter, onto the rest of the engine, and/or onto the ground. Over time, a number of approaches have been introduced to try to address this problem, including the use of oil drip pans, which typically sit under the engine to collect used oil that drips out during the removal process, and various other rigid containers which may be used to collect oil, or flexible plastic bags which may be placed under the oil filter during removal to collect used engine oil, but which may not be suitable for use with conventional tools for removing oil filters, or for use around hot engine parts.

None of these approaches provides a containment apparatus with all of the improvements set forth in this disclosure. There exists a need for an oil containment apparatus that is flexible enough to be utilized in and among the numerous hoses, tubes and wires of an engine, while still maintaining heat resistance so that the container does not degrade when used in the presence of hot engine parts. There further exists a need for a chemical resistant containment device which provides access for a conventional oil filter removal tool while still providing containment for oil spillage from the engine that may occur during removal, particularly for horizontal or upwardly angled oil filters, for which it is difficult to provide a collection device immediately below the filter without obstructing access for the tool(s) conventionally used for removing such filters. There further exists a need for a containment device which can be used to dispose of both the oil filter and spilled engine oil once the removal process is complete.

SUMMARY

An object of the oil filter bib of this disclosure if to provide a containment device that can catch and contain used engine oil during removal of an engine oil filter, particularly one that is mounted either horizontally or at an angle on the engine.

Another object is to provide an oil filter bib that comprises a material that is flexible enough to slip under and around the oil filter and the oil filter mount of the engine.

Disclosed herein are exemplary oil filter bibs that provide a "seal" under the oil filter before, during and after removal of the oil filter, by allowing the user to manually secure the bib.

In some embodiments, the disclosed bibs can allow the user at least one free hand while securing the bib, to allow the user to operate a tool for removal of the oil filter.

In some embodiments, the disclosed bibs can be inserted amongst, e.g., hoses, tubes, and wires located on the engine to secure it under and around the oil filter to prevent oil spillage and permit collection of the used oil and filter, without having to disconnect the hoses, tubes, and wires.

In some embodiments, the disclosed bibs comprise a heat-resistant material, so that the bib can be inserted amongst hot engine parts without risk of the container degrading during oil filter removal.

In some embodiments, the disclosed bibs comprise a chemical-resistant material, so that the bib will not leak oil through the sides during or after oil filter removal.

In some embodiments, the disclosed bibs comprise an aperture of sufficient size and shape to allow the use of a conventional oil filter removal tool to remove the oil filter without disrupting the seal under and around the oil filter.

In some embodiments, the disclosed bibs comprise a compartment of sufficient size to hold the oil filter and used engine oil once the filter is detached from the engine.

Some embodiments comprise an oil filter bib that is disposable.

The foregoing and other objects, features, and advantages of the oil filter bib of this disclosure will become more apparent from the following detailed description, which proceeds with reference to the accompanying figures.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phrase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises". Also, the terms "including" and "having" have the same meaning as "comprising".

It is to be understood that specific dimensions and measurements for the embodiments of the oil filter bib shown in the attached figures and/or otherwise described herein are exemplary, and that they can be varied.

Figure 1:
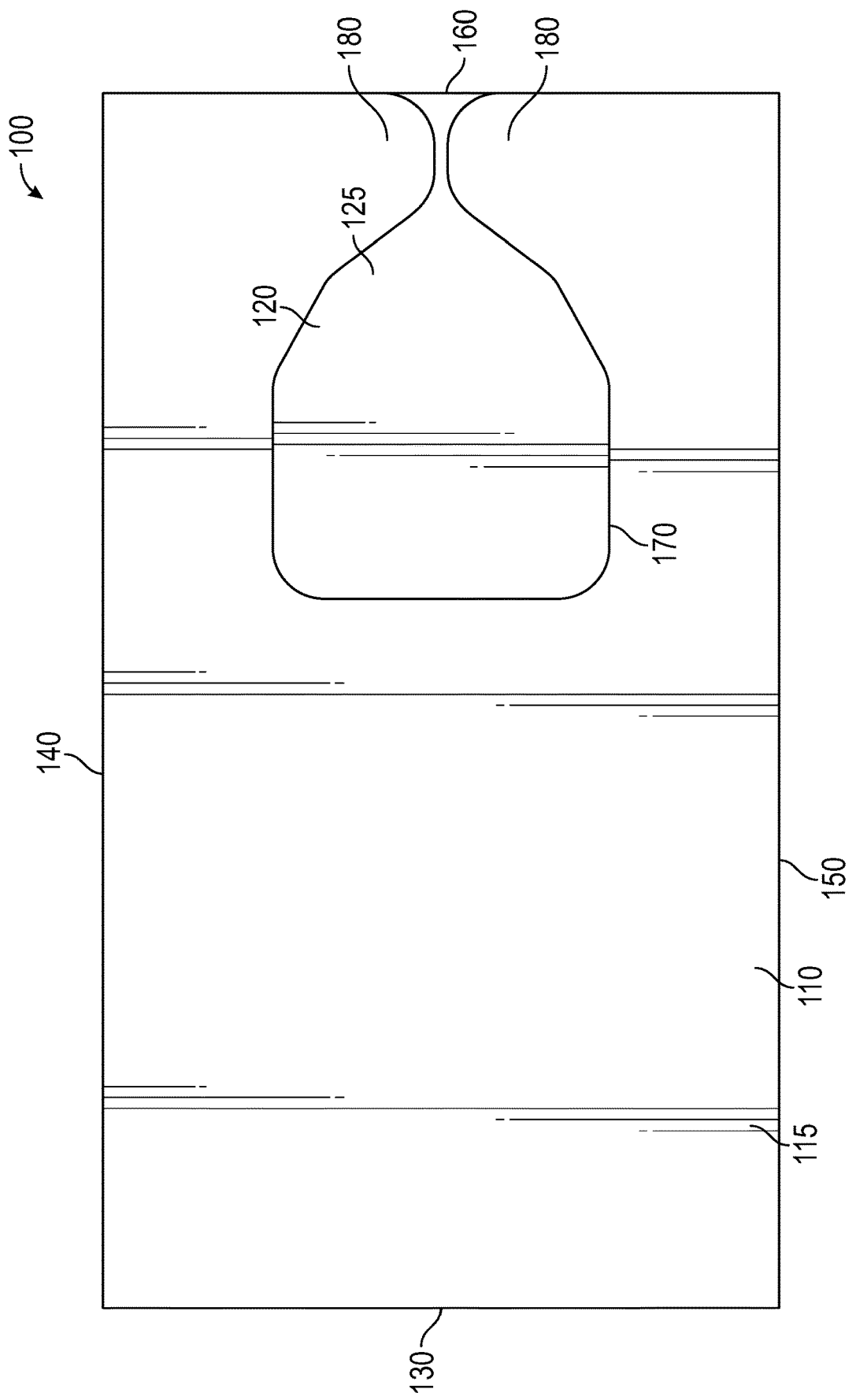
FIG. 1 is a top view of an oil filter bib in a flattened state, in accordance with an exemplary embodiment of this this disclosure

FIG. 1 shows a top view of an exemplary oil filter bib 100. The bib comprises two flexible elongate side panels: a front side panel 110 and a back side panel 120. The back side panel 120 is only partially visible in the figure. The two side panels 110, 120 are substantially coextensive, in that they are either the same size and shape, or are sufficiently close in size and shape that they can be sealingly secured together on at least three edges, as further described herein. Each side panel 110, 120 comprises an outer surface 115 and an inner surface 125. Any suitable material that is suitably flexible, durable, heat resistant, and/or sufficiently impermeable to organic compounds such as used engine oil, gasoline, diesel, and/or other fuels that may be mixed in with used oil, can be used for the oil filter bib. Because a flexible material is used, the oil filter bib 100 may be positioned within an engine compartment containing an oil filter (or other similar locations in which an oil filter is situated) without the need to disconnect wires, hoses, or other portions of the engine during oil filter removal, unlike conventional collection apparatus that may either require positioning below the engine (which may result in spillage of oil on other engine parts in engines which have oil filters situated above other parts of the engine), or which may require removal of wires, hoses, or other portions of the engine in order to position them.

The outer surface 115 desirably comprises a flexible heat resistant material. This allows the oil filter bib to be used in the presence of engine parts or used engine oil that might be sufficiently hot to degrade or burn a conventional plastic or paper bag or other materials that are not suitably designed to be heat resistant. One suitable material is a 2.2 osy woodpulp/polyester (65%/35%) spunlace nonwoven material, treated with a repellent, antistat and flame retardant, such as is found in the SoftGUARD material manufactured by Prevision Fabrics group, item number C751-91030.

The inner surface 125 desirably comprises a flexible material that is chemical resistant, in that it is suitable for holding in liquid chemicals, such as used engine oil, without the liquid permeating through the material. The term "chemical resistant" is used herein to mean the material is not degraded by or permeated by compounds typically found in used oil or around an internal combustion engine, such as oil, gasoline, diesel fuel, and/or other organic compounds (when the compounds are at any temperature typically occurring in or around an internal combustion engine). Similarly, "heat resistant" means the material does not burn or otherwise degrade substantially when exposed to temperatures typically found in or around an internal combustion engine.

One suitable material for the inner surface is 2.5 mil PVC film, as is also found in the SoftGUARD material referenced above. Because it is also chemical resistant, the SoftGUARD material is capable of holding in used engine oil without concern that it the oil will permeate through the oil filter bib and leak onto a user's hand or clothes, engine parts, or the ground. While the SoftGUARD material is one suitable material for the oil filter bib 100 in accordance with this disclosure, other suitable materials can also be used. Alternative materials can include treated paper, treated plastics, durable foils, treated cloth, treated fabrics, and/or other suitable materials.

In some embodiments, the bib material can comprise two material layers laminated together to form a single composite material. Any suitable methods of combining the outer and inner surfaces 115 and 125 together can be used, or a single material having the desirable properties can be used for both the inner and outer surfaces.

In the embodiment shown in FIG. 1, the front side panel 110 and back side panel 120 of the oil filter bib 100 are formed from a single piece of suitable material, which is folded onto itself to form a first side edge 140 at the fold. The folded material is then sealed on a bottom edge 130 and on a second side edge 150, while leaving an opening at a top edge 160 where an oil filter (not shown) may be inserted. The bottom edge 130 and second side edge 150 may be sealed, for example, using applied heat to melt the edges together, forming a seal on each edge so that used engine oil cannot leak out of the bib during or after removal of the oil filter. In alternative embodiments, side panels 110 and 120 at bottom edge 130 and second side edge 150 may be sealed by any suitable means, such as by welding, heat sealing, RF welding, secured together using a pressure sensitive adhesive or other types of adhesive or by stitching, or secured together using other suitable methods, or by any combination of such methods. In an alternative embodiment, the oil filter bib 100 may be formed by folding a suitable material onto itself to form the bottom edge 130, and sealing the first and second side edges 140 and 150 using any combination of the above methods. In still another embodiment, the oil filter bib 100 may be formed from an extruded tube of suitable material, thus eliminating the need to seal the second side edge 150. The bottom edge 130 of the oil filter bib 100 can then be sealed using any of the above methods. In still other embodiments, the oil filter bib may be formed from two separate pieces of suitable material, which are sealed at the bottom edge 130, and also at the first and second side edges 140 and 150 using any combination of the above methods.

Figure 2:
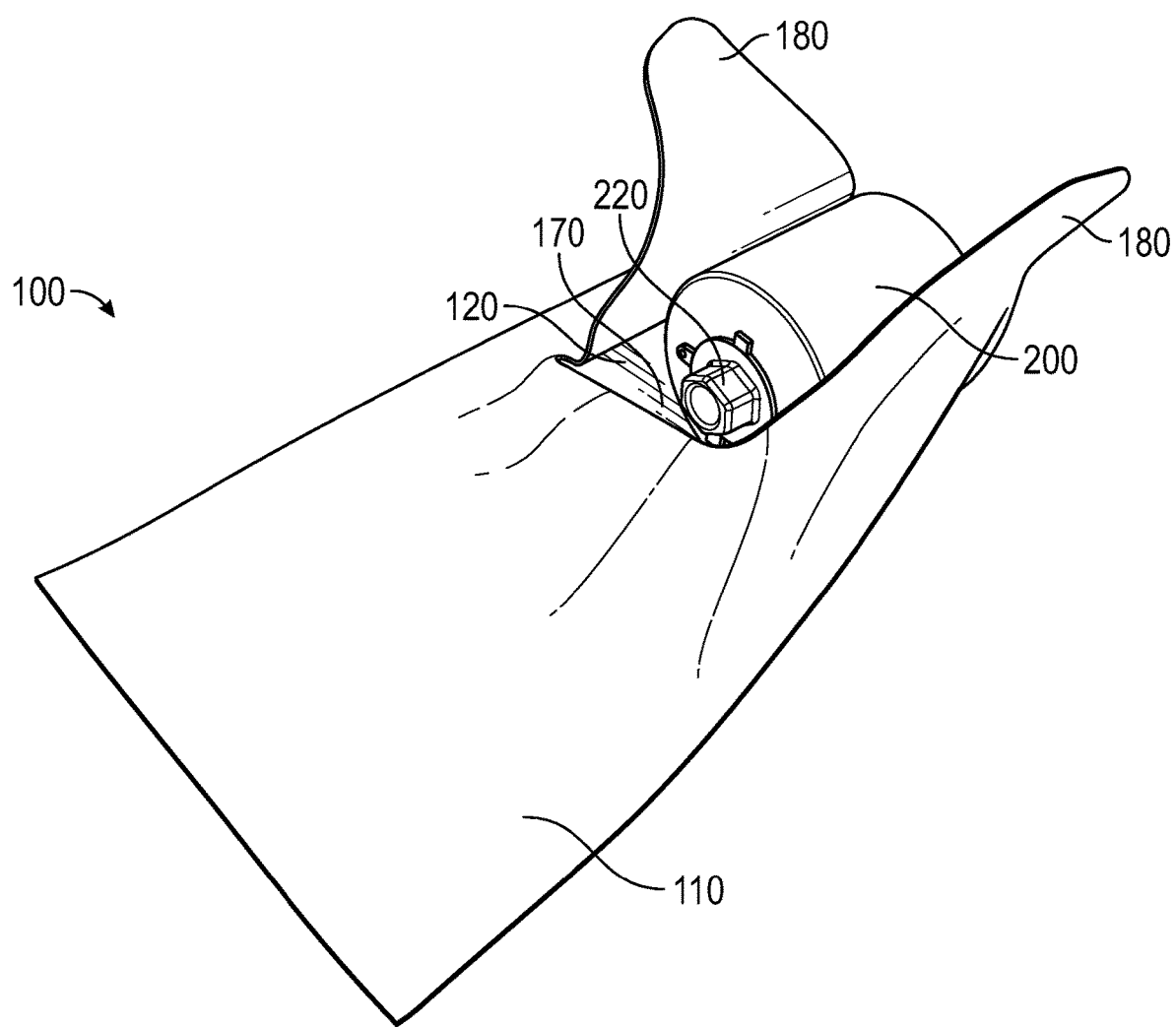
FIG. 2 is a perspective view of the oil filter bib of FIG. 1 positioned around an oil filter.
Figure 3:
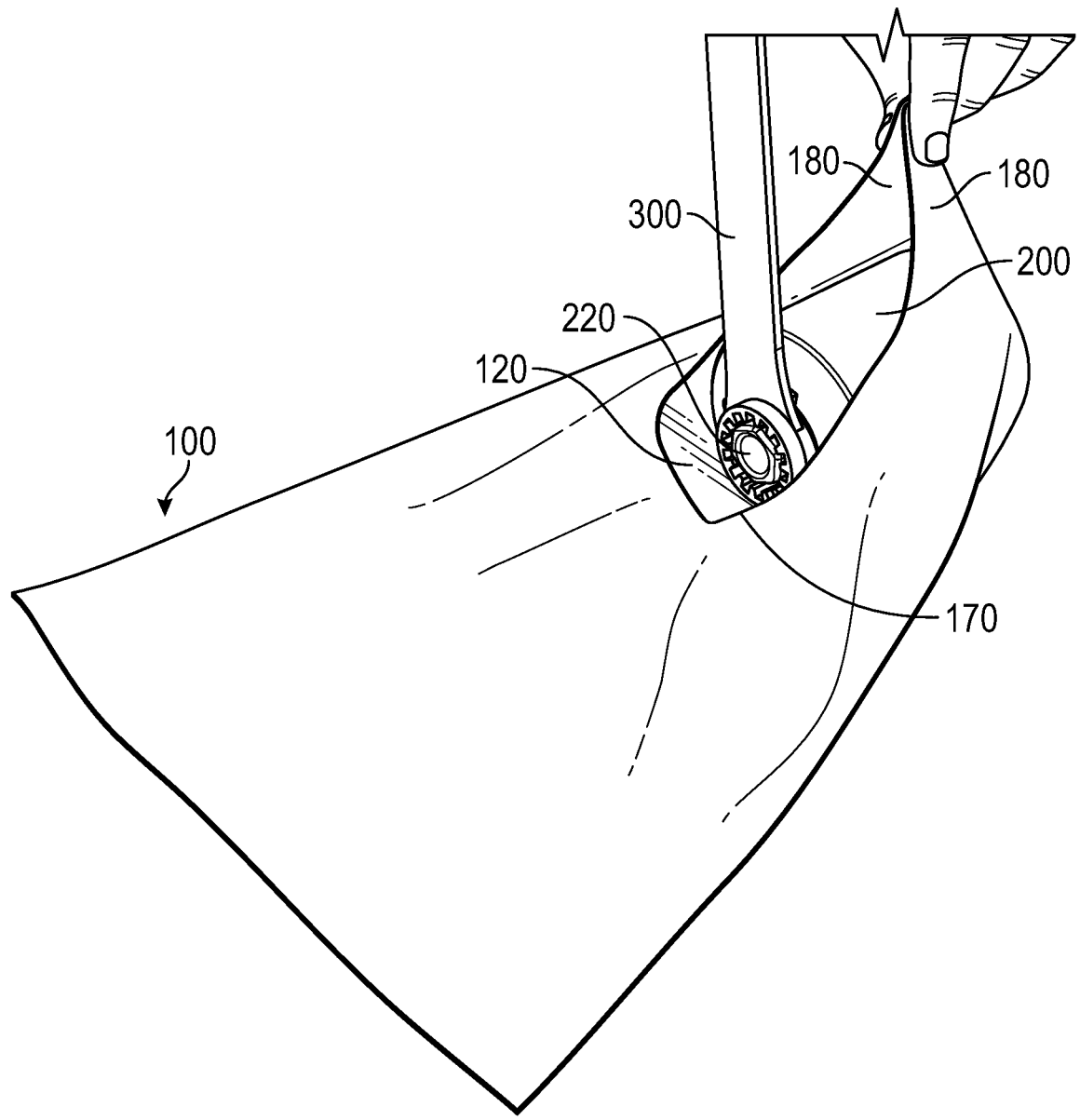
FIG. 3 is a perspective view of the oil filter bib of FIGS. 1 and 2 showing insertion of a tool for removal of the oil filter.
Figure 4:
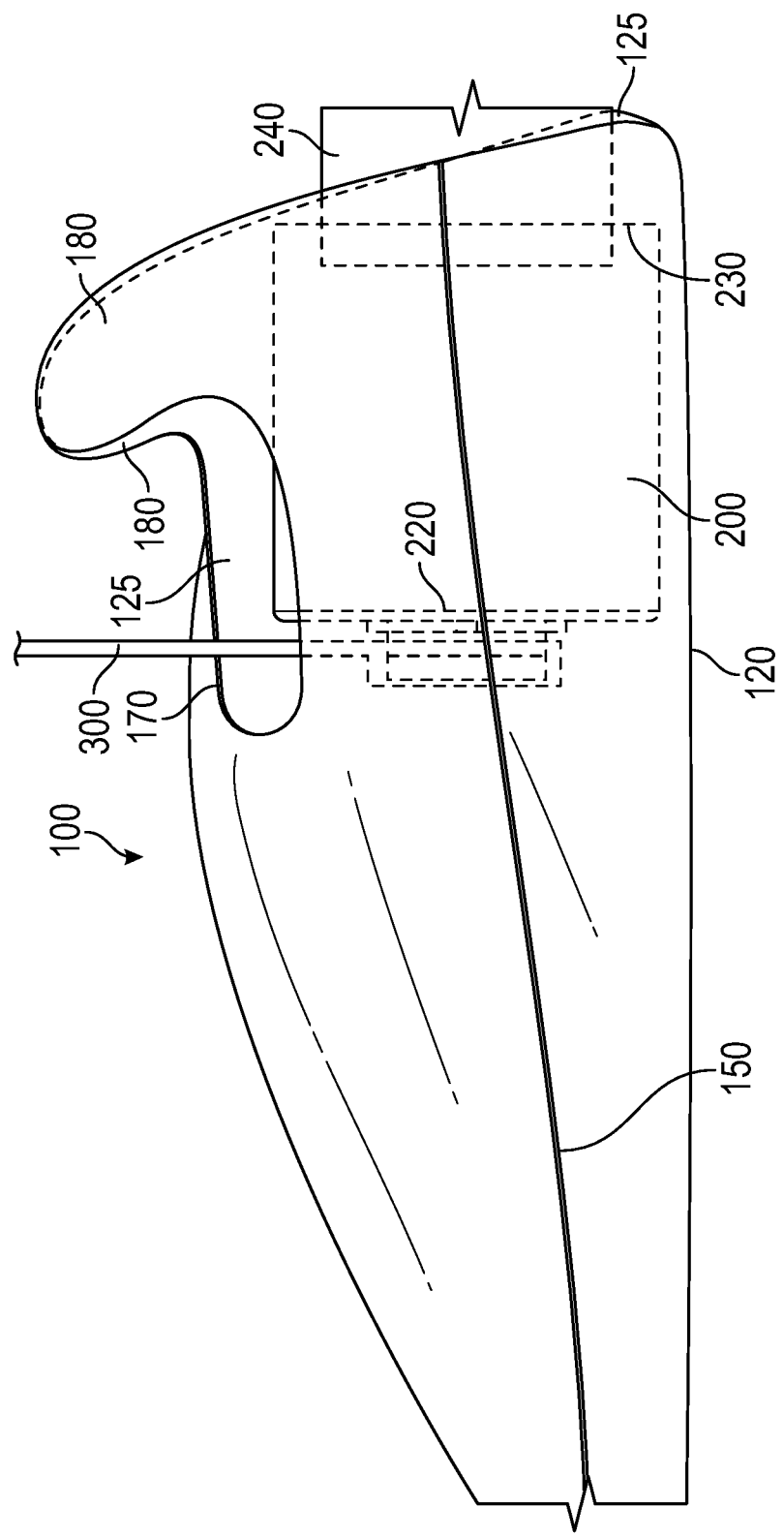
FIG. 4 is a side view of the oil filter bib, oil filter, and tool of FIG. 3.

The front side panel 110 of the oil filter bib comprises an oil filter removal aperture 170 located near the top edge 160, which is of sufficient size and shape to expose the free end of an oil filter, as further shown in FIGS. 2-4. The oil filter removal aperture 170 can be offset from the top edge 160 by a sufficient distance so that two graspable tabs 180 may be formed at or near the top edge 160 for a user to grasp and secure the oil filter bib 100 during and after removal of the oil filter. In some embodiments the graspable tabs 180 may further be secured together using temporary or permanent adhesive, a hook and loop material (e.g., Velcro), or another suitable material that may allow the graspable tabs to be more readily held together by a user's hand during removal of the oil filter.

FIG. 2 illustrates the oil filter bib 100 of FIG. 1, having inserted therein an oil filter 200. The filter can still be attached to an engine or a location near the engine in this position. As shown in FIG. 2, graspable tabs 180 may be pulled back to allow for insertion of the oil filter 200 into the oil filter bib 100, such that the back side panel 120 of the oil filter bib 100 is situated under the oil filter 200. Oil filter 200 is positioned within the oil filter removal aperture 170 to allow access to the oil filter 200 by, e.g., a conventional tool (FIG. 3) that can be used for removal of the oil filter, e.g., by engaging and turning a narrow end 220 (e.g., a hex nut) of the oil filter 200, as further shown in FIGS. 3 and 4.

Referring to FIGS. 3 and 4, a conventional oil filter removal tool 300 is shown extending through the oil filter removal aperture 170 and engaging with the narrow end 220 of the oil filter 200. One such suitable tool is a socket wrench. Further examples of tools that may be used in conjunction with the oil filter bib 100 of this disclosure include, but are not limited to, closed end or open end wrenches, screwdrivers, or strap wrenches, though other conventional removal tools may also be used.

Figure 5:
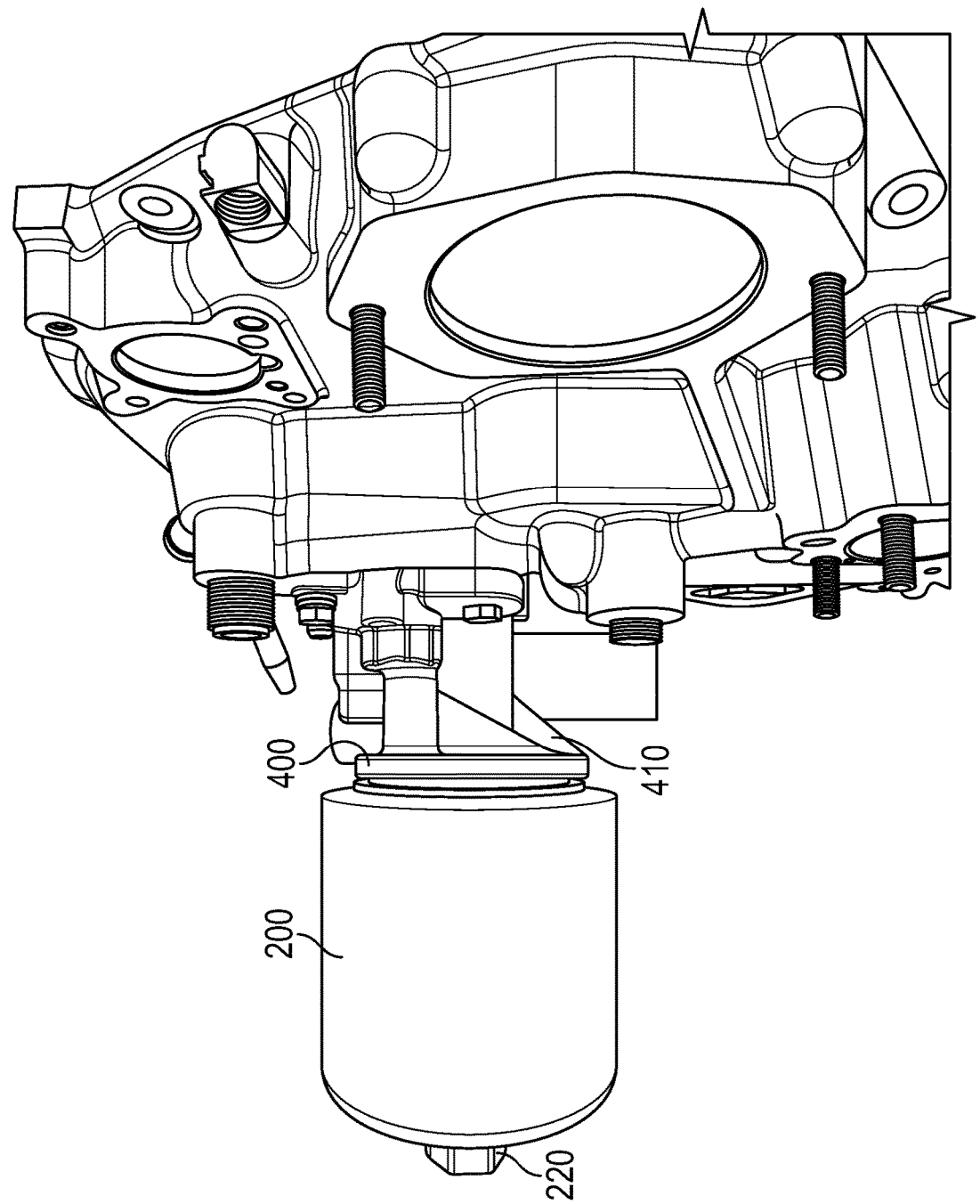
FIG. 5 is a side view of an exemplary engine including an oil filter attachment component to which an oil filter is attached. The oil filter bib of this disclosure can be used with this type of engine as well.

In order to "seal" the oil filter 200 within the oil filter bib 100 during removal of the oil filter, graspable tabs 180 may be pulled up and secured together with a user's hand, drawing the back side panel 120 of the oil filter bib 100 up under and around the oil filter 200, as further described herein. Because the graspable tabs 180 are configured to be capable of being secured by a user using one hand, the user's other hand is free to use the removal tool 300 to remove the oil filter 200. As shown in FIG. 4, as the graspable tabs 180 are pulled up, the inner surface 125 of the back side panel 120 of the oil filter bib 100 is drawn up and around a proximal end 230 of the oil filter 200 (i.e., the end where the filter connects to the engine or other location of a vehicle), and in some embodiments, at least partially around a stem 240 or other protuberance that connects the oil filter 200 to the engine or other location of a vehicle (as shown in FIG. 5). The graspable tabs 180 may be pulled upwards to improve the "seal" of the oil filter bib 100 under the oil filter 200 and, in some embodiments, around the oil filter adaptor 240 or other portions of the engine or other support structures to which the filter is attached. In some embodiments, the element 240 to which the filter is attached can comprise a male component that is threadably attached to a female component of the filter, and in some embodiments the element 240 can comprise a female component to which a male component of the filter is attached. The component 240 can be bolted onto the engine (as in element 400/410 in FIG. 5), or the component 240 can be a part the engine itself, or can be a firewall or other mounting structure in the engine bay or near the engine.

Pulling the tabs upwards and back towards the free end of the oil filter 200, e.g., at an angle of 45 degrees away from the engine/adaptor (see example in FIG. 5), may further improve the seal to cause the lower lip of the bag to seal around the bottom surfaces of both the filter and the adapter, though other methods for pulling up on the graspable tabs may also be used. Pulling up on the graspable tabs 180 facilitates the oil filter bib 100 enclosing the oil filter 200, even for oil filters which are mounted horizontally or at an upwardly projecting angle. This is particularly beneficial in engine designs where the oil filter is situated above other engine parts, such as in certain aircraft engines, in which not enclosing the oil filter during removal may result in used engine oil spilling onto other engine parts, as well as onto the user and the ground.

Figure 6:
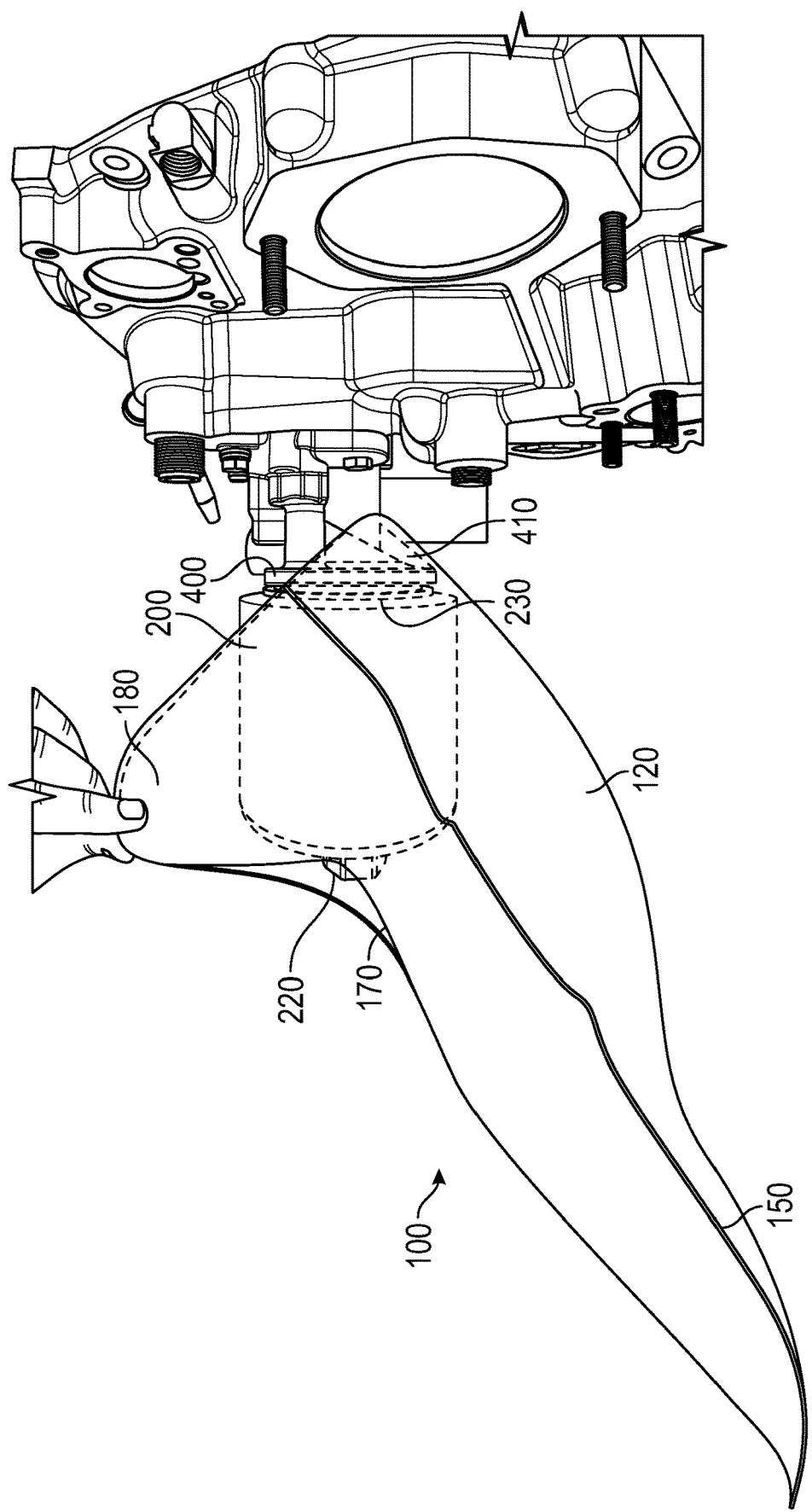
FIG. 6 is a side view of the oil filter bib positioned around the oil filter and adapter of FIG. 5 during an oil filter removal operation.

FIGS. 5 and 6 show another oil filter arrangement with which the oil filter bib 100 of this disclosure may be advantageously employed. In this arrangement, the oil filter 200 is connected to an oil filter adapter 400, which may in some embodiments include a sloped underside 410 situated behind the proximal end of the oil filter 200 when the oil filter is attached to the adapter. As shown in FIG. 6, the oil filter bib 100 is drawn up under the oil filter 200 as well as at least a portion of the sloped underside 410 of the oil filter adapter 400. Pulling the graspable tabs 180 upward and away from the engine/adapter/mounting structure can better ensure that the back side panel 120 of the oil filter bib 100 fully surrounds and seals against the underside of the proximal end 230 of the oil filter 200 and at least part of the sloped underside 410 of the oil filter adapter 400, while still allowing access to the free end of the oil filter 220 through the oil filter removal aperture 170 for removal of the oil filter using a suitable oil filter removal tool (not shown).

Figure 7:
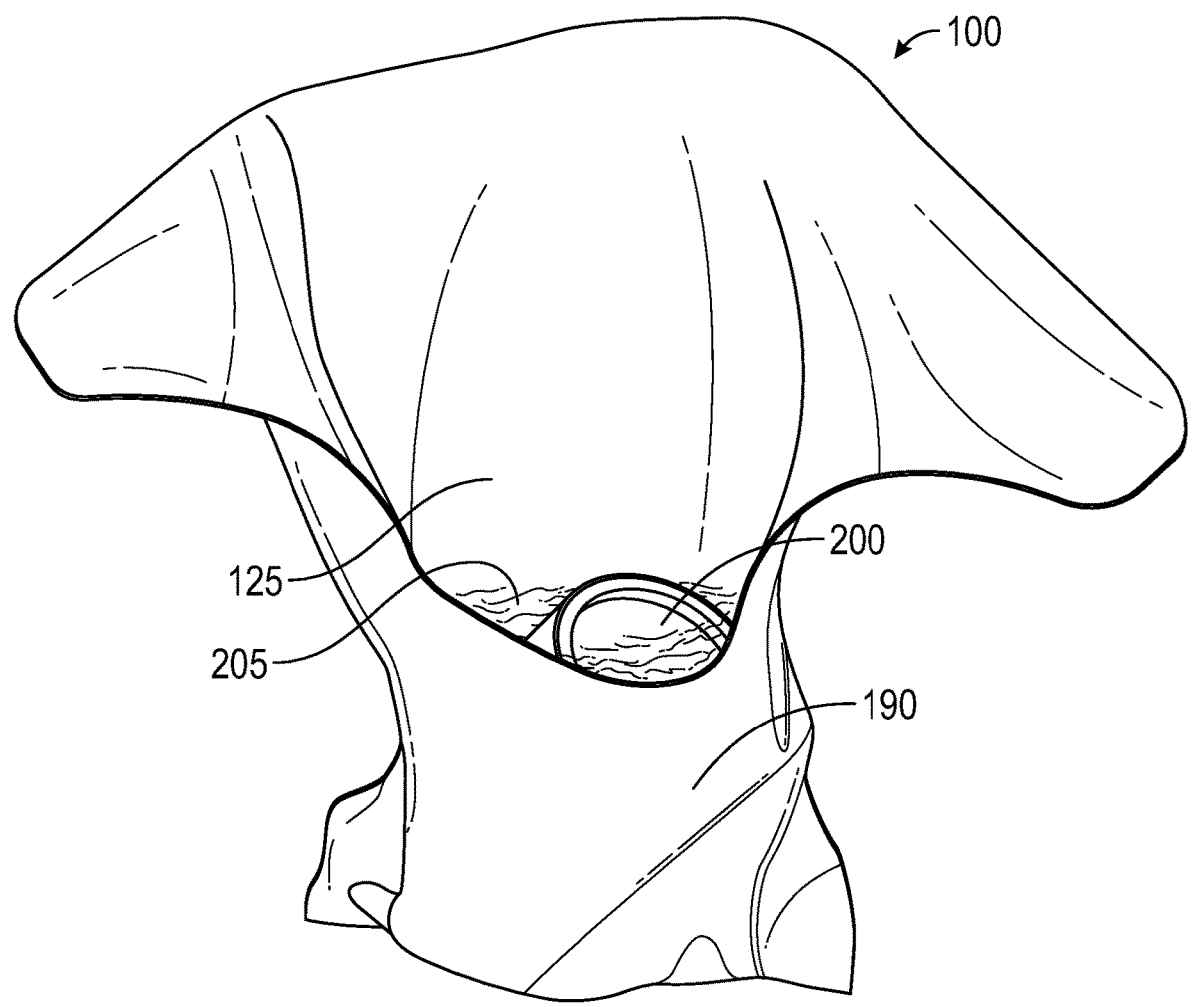
FIG. 7 shows the oil filter bib of FIG. 2 after removal and collection of the oil filter from the engine.

Referring to FIG. 7, the used oil filter 200 is shown contained within the oil filter bib of FIG. 2, after the oil filter has been removed from the engine. As shown, the oil filter bib contains a compartment 190 of sufficient size to hold the oil filter 200, as well as any used engine oil 205 which may drain from the engine or from the oil filter 200 during or after removal of the oil filter 200. In this way, once the oil filter 200 has been removed, the oil filter bib 100 containing the oil filter 200 and any associated used engine oil 205 can be disposed of together.

Figure 8:
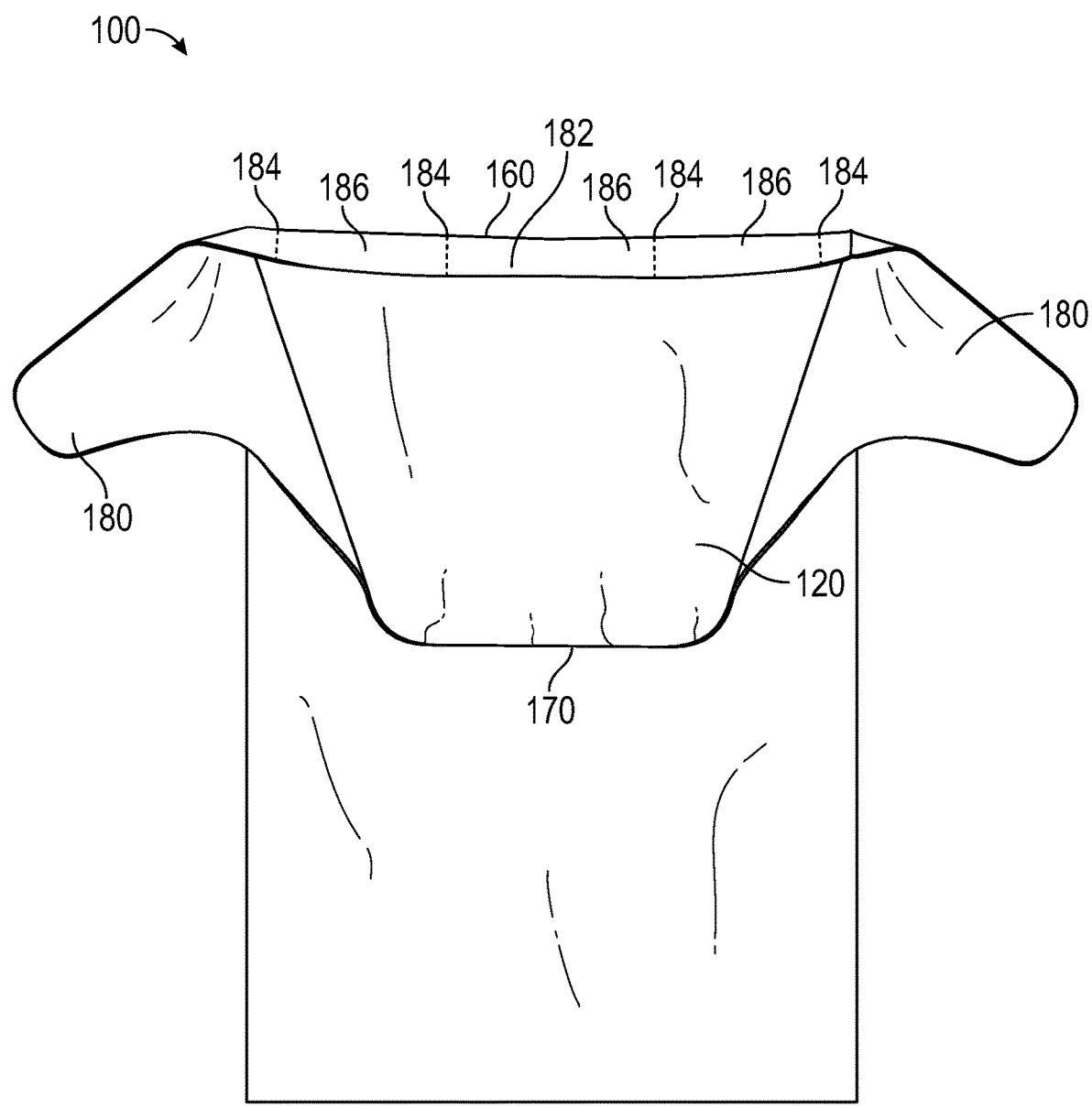
FIG. 8 is a top view of an oil filter bib with the graspable tabs folded back, in accordance with another exemplary embodiment of this this disclosure
Figure 9:
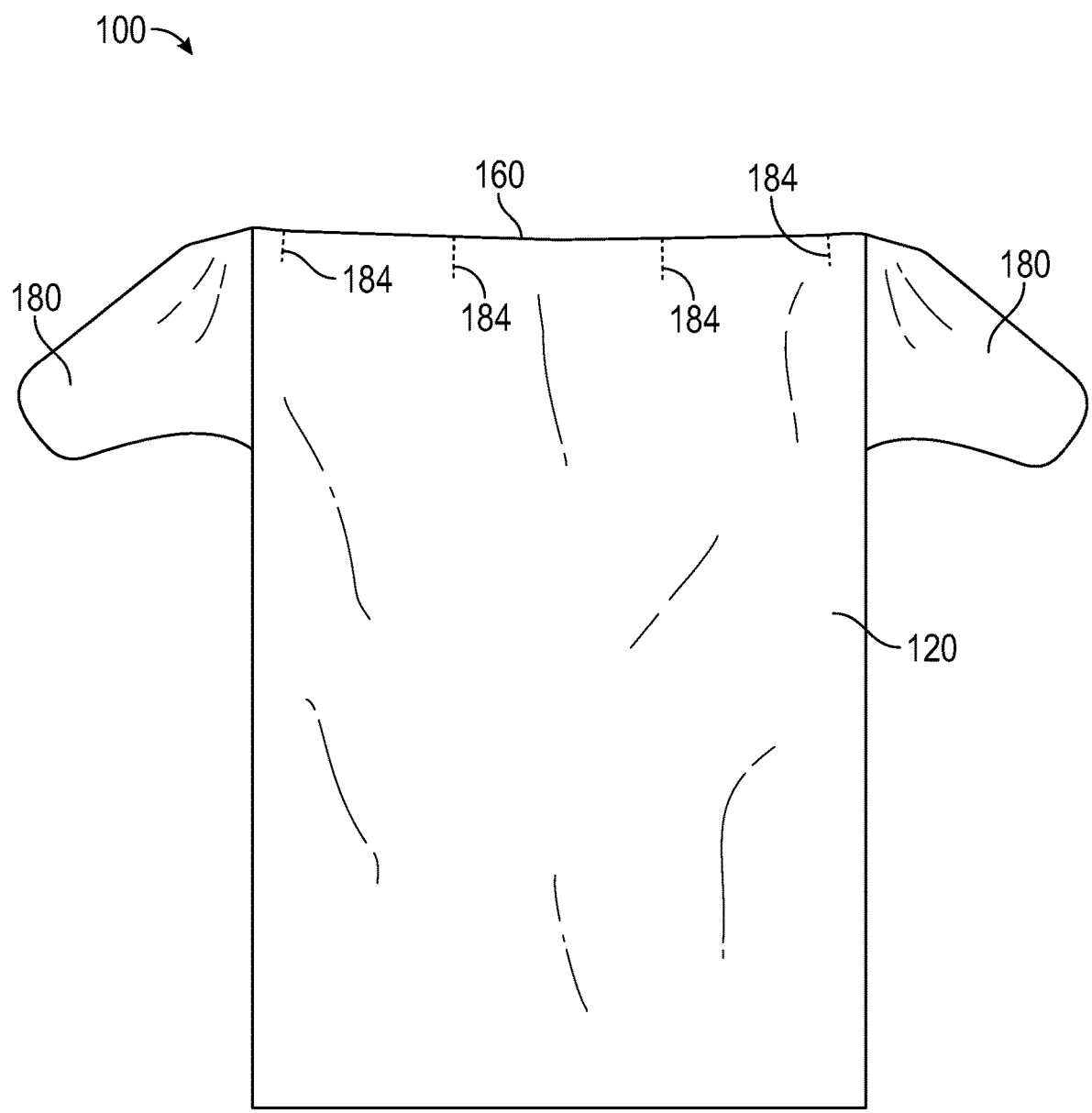
FIG. 9 is a bottom view of the oil filter bib of FIG. 8.

As shown in FIGS. 8 and 9, in some embodiments, the lower lip of the bag can include a curled or folded edge 182 proximate to the top edge 160 that projects up, or a dam or other added strip along the inner surface of the lower lip of the bag, to help prevent oil accidentally spilling out of the bag during filter removal. In particular embodiments, approximately one half of an inch of the top edge 160 of the bag 100 can be used to form the curled or folded edge 182, though more or less of a folded edge may be used. This curled or folded edge 182 can help the lower lip better seal up and under the adapter/engine/mounting structure to prevent retrograde flow of used oil out of the bag during and after the filter removal process. In some embodiments, the curled or folded edge 182 may be secured with one or more seals 184 to ensure that the folded edge remains folded back in the direction of the oil filter removal aperture 170 in operation to facilitate sealing and further prevent retrograde flow of used oil. In the illustrated embodiment, four seals 184 are used, though it is to be understood that more or fewer seals may be used. These seals 184 may be provided, e.g., by heat sealing the folded edge of the bag to the back side panel 120 in a direction generally perpendicular to the folded edge, as shown in FIG. 9. Alternatively, the seals 184 may comprise RF seals or an adhesive such as glue, or other suitable means for securing the curled or folded edge. Alternatively other means may be used to secure the folded edge other than sealing, such as tacking, stapling, or other suitable means. In other embodiments, the seals or other securement means may be arranged in a direction other than perpendicular. In some particular embodiments, multiple seals 184 may be used to create one or more containment pockets 186 proximate to the top edge of the bag 160.

Figure 10:
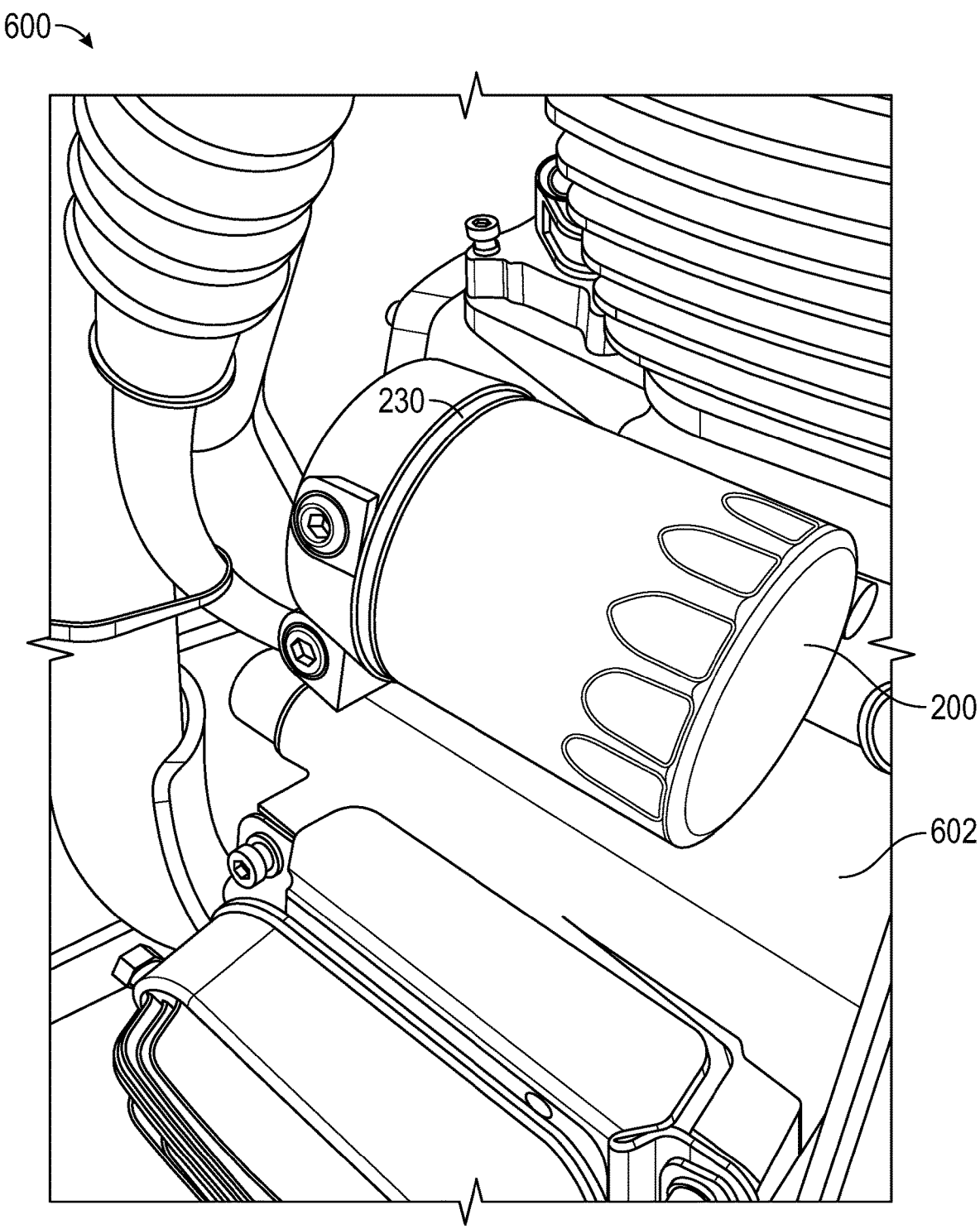
FIG. 10 is a perspective view of another exemplary engine to which an oil filter is attached. The oil filter bib of this disclosure may be used with this type of engine oil filter assembly, as well.
Figure 11:
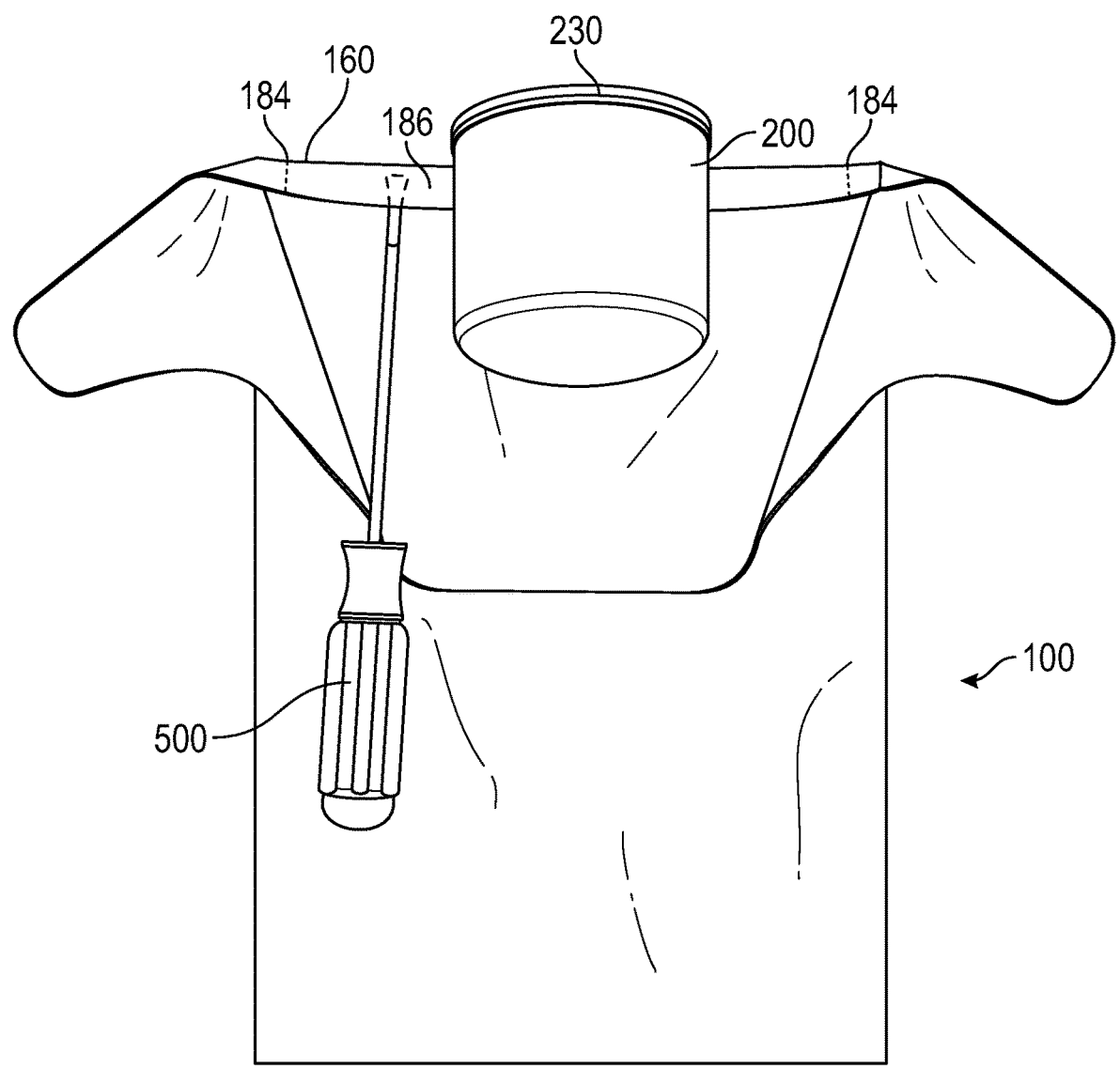
FIG. 11 is a top view of the oil filter bib of FIGS. 8 and 9, showing insertion of a tool for placement of the oil filter bib and placement of an oil filter.

FIGS. 10 and 11 show another oil filter arrangement with which the oil filter bib 100 of this disclosure, and in particular the embodiment shown in FIG. 8, may be advantageously employed. In this arrangement, the oil filter 200 is connected to an engine assembly 600 in which a number of parts of the engine, such as ABS plate 602, are situated in close proximity to the oil filter 200. The presence of these proximate engine parts may make it more challenging to ensure that the oil filter bib 100 surrounds the proximal end 230 of the oil filter 200 without some means for pushing the top edge 160 of the oil filter bib 100 to or beyond the proximal end 230 of the oil filter 200. Some examples of such engines include certain motorcycle engines (e.g., Harley Davidson engines), automotive engines and tractor engines, though other engines may also have similar oil filter constraints that may benefit from the embodiments of this disclosure.

Figure 12:
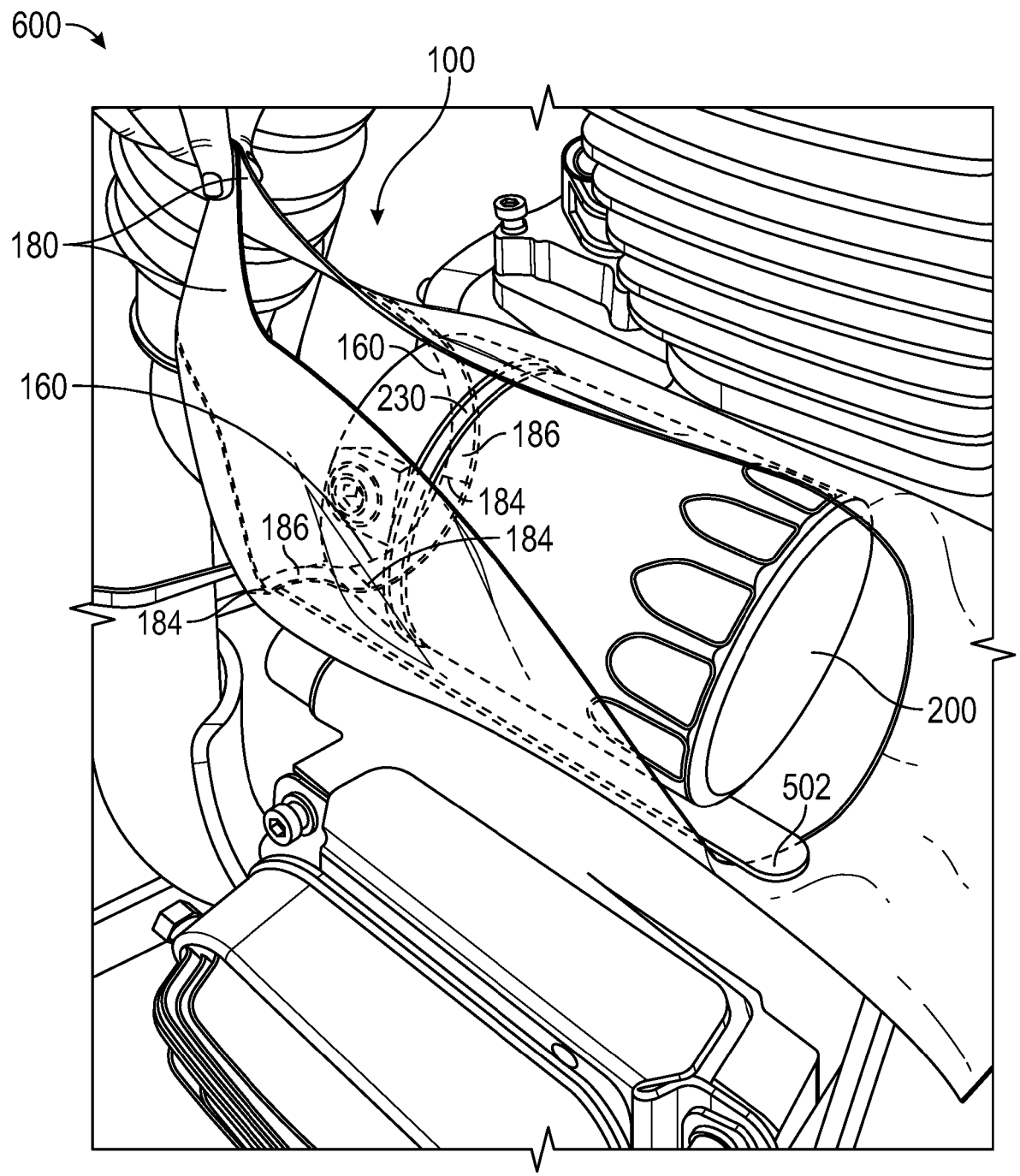
FIG. 12 is a perspective view of the oil filter bib of FIG. 8 positioned around the oil filter of FIG. 10.

As illustrated in FIGS. 11 and 12, when the oil filter bib 100 of FIG. 8 is brought up under the oil filter 200, an elongate tool 500 (shown in FIG. 10 as a flat head screwdriver) can be extended into one of the containment pockets 186 to aid in pushing the top edge 160 of the oil filter bib 100 up and under and around the proximal end 230 of the oil filter 200 to ensure that the oil filter bib 100 seals up and underneath the oil filter 200, to maximize containment of engine oil during removal of the oil filter 200. While the elongate tool 500 is shown as a screwdriver in FIG. 11, any elongate tool that can be used to push the top edge of the bag 160 under the proximal end 230 of the oil filter 200 may be used. Some other examples might include a ruler or other suitable low profile elongate tools, such as a tongue depressor 502, as shown in FIG. 12.

In order to ensure that the oil filter bib 100 is secured around the proximal end 230 of the oil filter 200, it may be desirable to insert the elongate tool 500 into a first pocket 186 on a first side of the oil filter bib and push the oil filter bib up towards the proximal end, and then remove the tool and insert the tool into a second pocket on a second side of the oil filter bib and/or a pocket in the center of the oil filter bib. In this way, the top edge of the bag 160 can be incrementally pushed up and under the proximal end 230 of the oil filter 200. This process can then be repeated until the oil filter bib 100 is in place.

In engine assemblies such as the one shown in FIGS. 11 and 12, once the oil filter bib 100 is secured around the proximal end 230 of the oil filter 200, in some cases it may be desirable to pull the graspable tabs directly up, as opposed to up and back towards the free end of the oil filter to ensure that a tight seal is formed around the underside and lateral sides of the oil filter 200, and that the top edge of the bag 160 remains positioned under the proximal end 230 of the oil filter 200.

In view of the many possible embodiments to which the principles disclosed herein may be applied, it should be recognized that the illustrated embodiments are only examples and should not be taken as limiting the scope of this disclosure. Rather the scope of this disclosure is at least as broad as the following claims. I therefore claim all that comes within the scope and spirit of these claims.

I claim:

1. An oil filter bib formed of a flexible material and comprising:
    an open end;
    a closed end opposite the open end;
    an upper side panel extending between the open end and the closed end; and
    a lower side panel extending between the open end and the closed end;
    wherein the upper side panel comprises:
        an oil filter removal aperture spaced apart from the open end of the bib, wherein the oil filter removal aperture is configured to permit access through the upper side panel to a free end of an oil filter by an oil filter removal tool when the bib is positioned around the oil filter while a fixed end of the oil filter is mounted to an engine or other mounting object; and
        first and second graspable tabs situated between the oil filter removal aperture and the open end of the bib, wherein the first and second graspable tabs are configured to extend around the oil filter and configured to be grasped together above the oil filter to secure a free end of the lower side panel under the fixed end of the oil filter during removal of the oil filter from a mounted location; and
    wherein the bib defines an internal oil filter disposal compartment situated between the upper side panel and the lower side panel, and between the closed end and the oil filter removal aperture, wherein the oil filter disposal compartment is configured to receive the oil filter and used oil when the oil filter is removed from its mounting location without spilling oil from the removed oil filter.

2. The oil filter bib of claim 1, wherein the first and second graspable tabs comprise opposing projections of the upper side panel that are spaced apart from each other by a narrow gap in the upper side panel, the narrow gap extending from the open end of the bib to the oil filter removal aperture.

3. The oil filter bib of claim 1, wherein the flexible material further comprises a heat-resistant material.

4. The oil filter bib of claim 1, wherein the flexible material further comprises an oil-resistant material.

5. The oil filter bib of claim 1, wherein the flexible material further comprises at least two material layers, wherein at least one of the material layers comprises a heat-resistant material, and wherein at least one of the material layers comprises an oil-resistant material.

6. The oil filter bib of claim 1, wherein the flexible material comprises a single material layer, wherein the single material layer comprises both a heat-resistant material, and an oil-resistant material.

7. The oil filter bib of claim 1, wherein the first and second graspable tabs further comprise an adhesive material for securing the graspable tabs together.

8. The oil filter bib of claim 1, further comprising a folded edge at the open end of the bib configured to further contain used oil when the oil filter is removed, wherein the folded edge is sealed to the lower side panel to form one or more pockets to further contain the oil.

9. The oil filter bib of claim 1, further comprising a folded edge at the open end of the bib, wherein the folded edge comprises a plurality of seals formed in the folded edge to form pockets, and further wherein the pockets are configured to receive an end of an elongate tool to facilitate positioning the open end of the bib under the fixed end of the oil filter.

10. The oil filter bib of claim 9, wherein the plurality of seals are formed in an orientation that is generally perpendicular to the folded edge.

11. The oil filter bib of claim 10, wherein the plurality of seals comprise heat seals.

12. The oil filter bib of claim 1, wherein the oil filter bib is further configured to permit a user to perform a method comprising:
    placing the oil filter bib at least partially around an oil filter having a fixed end and a free end, wherein the fixed end of the oil filter is removably fixed to a vehicle in a location on or near the vehicle's engine, wherein a lower portion of the bag is positioned under the fixed end of the oil filter;
    with the oil filter bib held at least partially around the oil filter, inserting a tool through the oil filter removal aperture in the oil filter bib to engage the oil filter;
    using the tool, removing the oil filter from the location on or near the vehicle's engine with the oil filter bib positioned at least partially around the oil filter; and
    allowing the removed oil filter to fall into the oil filter bib.

13. The oil filter bib of claim 12, wherein the aperture in the oil filter bib is at least as long as the oil filter.

14. The oil filter bib of claim 12, wherein the oil filter removal aperture is smaller than the oil filter.

15. The oil filter bib of claim 12, wherein placing the oil filter bib at least partially around the oil filter comprises grasping the two graspable tabs of the oil filter bib together above the oil filter to hold the bag in place.

16. The oil filter bib of claim 15, wherein the grasping further comprises pulling the two graspable tabs upward and towards the free end of the oil filter, such that a lower lip of the oil filter bib is situated under and past the fixed end of the oil filter.

17. The oil filter bib of claim 15, wherein the grasping further comprises pulling the two graspable tabs upward and away from the location where the filter is attached, towards the free end of the oil filter, at an angle offset from vertical.

18. The oil filter bib of claim 12, wherein a lower lip of the oil filter bib is placed under and at least partially surrounding an oil filter adapter positioned at or near the fixed end of the oil filter.

19. The oil filter bib of claim 15, wherein the oil filter bib is further configured to permit:
the placing, inserting and removing steps to be performed by a single user, and
the two graspable tabs to be grasped together by the user with the user's first hand to hold the bag in place, while the inserting and removing steps are performed by the user with the user's second hand.

20. The oil filter bib of claim 12, wherein placing the oil filter bib further comprises inserting a tool into a pocket adjacent an open end of the bag and pushing the oil filter bib toward the fixed end of the oil filter.

* * * * *